United States Patent [19]

Freund et al.

[11] Patent Number: 4,792,480

[45] Date of Patent: Dec. 20, 1988

[54] LAMINATE MATERIAL FOR USE IN PROTECTIVE CLOTHING

[76] Inventors: Paul X. Freund, 315 E. Grandview Ave., Zelienople, Pa. 16063; Sheridan J. Rodgers, R.D. #2 James Dr., Ellwood City, Pa. 16117; Christopher J. Kairys, 3854 Dolphin Dr., Allison Park, Pa. 15101

[21] Appl. No.: 95,682

[22] Filed: Sep. 14, 1987

[51] Int. Cl.⁴ .............................................. B32B 27/00
[52] U.S. Cl. .................................... 428/286; 428/296; 428/456; 428/461; 428/516; 428/518; 428/520
[58] Field of Search ............... 428/286, 296, 456, 461, 428/516, 518, 520

[56] References Cited

U.S. PATENT DOCUMENTS 4,214,321  7/1980  Nuwayser ............................ 428/461
4,588,646  5/1986  Athey ................................... 428/457

Primary Examiner—Marion C. McCamish
Attorney, Agent, or Firm—Douglas K. McClaine

[57] ABSTRACT

A material suitable for fabrication into protective garments that is a laminate formed from a layer of a reflective metallic material to provide flash protection and a layer that inhibits penetration by toxic and corrosive chemicals to protect against chemical exposure; both adhered to a cloth substrate to provide support.

10 Claims, 1 Drawing Sheet

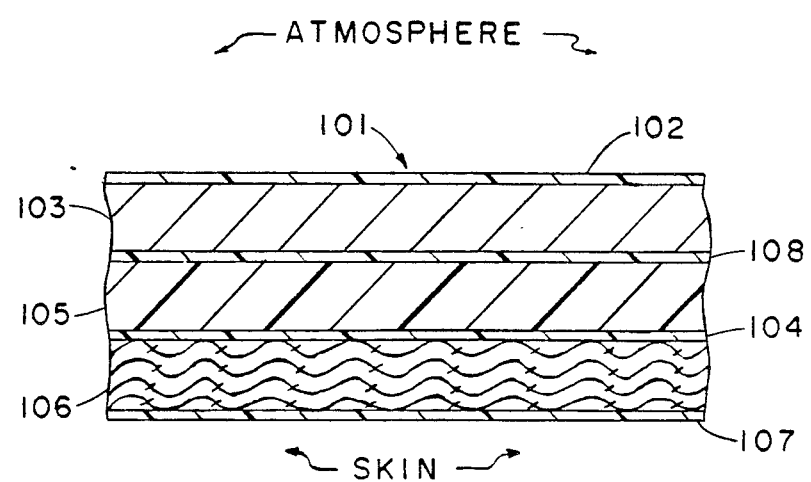

LAMINATE MATERIAL FOR USE IN PROTECTIVE CLOTHING

FIELD OF THE INVENTION

This invention is related to the field of materials for use as protective clothing.

BACKGROUND OF THE INVENTION

This invention relates to laminated materials suitable for use on protective clothing to guard against hazardous material (HAZMAT) exposure, while also providing flash protection.

In most HAZMAT control operations, a hazardous material specialist (hereinafter "fire fighter") is confronted with at least two possible hazards. The first hazard is the exposure to and subsequent skin contact with toxic or corrosive chemicals or materials. The second hazard is the exposure to sudden, intense flashes of fire and heat.

Various protective clothing is known in the art to prevent skin contact with toxic agents. Some of this clothing is made out of laminated material such as the material described in Nuwayser, U.S. Pats. No. 4,214,321 and Athey, Jr., 4,588,646. The purpose of using a laminate material is to create a composition that contains the most desirable properties of the individual layers. For example, a material may be a composite of a chemcially resistive barrier to prohibit the passage of the chemical through the material, and a substrate material that strengthens the chemical resistive barrier so that the composite can be used to make clothing.

Various laminates have been created to provide protection from chemicals having a variety of chemical properties. For example, the Mine Safety Appliances Company (MSA) of Pittsburgh, Pennsylvania sells two different protective suits. The first suit is comprised of a three-layer material of Viton ® (registered trademark of E. I. duPont de Nemours Co.) on a nylon substrate on neoprene. This suit is used for cleanups of spills such as, for example, benzene or gasoline. The second type of suit manufactured by MSA is comprised of a different three-layer material of butyl on polyester on neoprene. This laminate composition is effective for use in cleaning spills such as acetone or chlorine.

However, none of the previously aforementioned clothing provides protection against sudden heat flashes. Sudden heat flashes can occur when oxygen suddenly becomes available to a flammable source, or when a chemical reaches its ignition temperature.

There are three types of heat that accompany such sudden fire flashes. The first type is convective heat such as the heat that the body would sense in a sauna. Convective heat occurs when the body is in direct contact with the heat source or flame. The second type is conductive heat such as the heat experienced by the body when it would come in contact with, for example a heating pad. Conductive heat requires a conduction medium such as air or water or, as in the present example, the heating coil and material in a heating pad. The third type of heat is radiant heat such as the heat generated by the sun or a sun tan bed. The most intense radiant heat occurs upon combustion of the material. Radiant heat has a higher specific heat than convective or conductive heat and therefore can be much more dangerous to the fire fighter than conductive or convective heats.

A sudden heat flash contains both convective heat (flames) and radiant heat (radiant energy). A flash may be short lived, however, it can generate enough heat to seriously burn or kill a fire fighter. In order to minimize the amount of heat that is absorbed by the body of the fire fighter, the fire fighter can wear a protective suit that is made from a material that reflects the heat.

Many flash protection suits are commercially available. The suits are comprised primarily of a metal foil or reflective layer attached to a substrate for strength. The foil or reflective layer acts to prevent the body from absorbing the heat energy by reflecting the energy away from the body. The principal is much the same as using a light colored roof to reflect heat from the sun away from the roof rather than a black roof that will absorb the sun's heat into the roof.

Previously, when confronted with fighting fires caused by HAZMAT spills or fighting fires in chemical plants, the fire fighter had to decide whether to wear a chemically resistant suit to guard against chemical splash or to wear a flash protection suit to guard against sudden fire flashes. With either choice, the fire fighter was in peril of being exposed to the other hazard. It has thus been desirable to provide a single protective suit that could guard against both chemical splashes and fire flashes. The present invention provides a single suit that provides protection against both.

SUMMARY OF THE INVENTION

The present invention provides a protective material that can be manufactured into protective clothing for use by fire fighters, to provide protection against chemical splashes and heat from sudden fire flashes. The material is comprised of a multi-layered laminate that is made from seven layers. The seven layers are, from the skin out, heat sealable flame retardant polyethylene, a substrate such as spun laced Nomex, flame retardant polyethylene, a chemical resistive layer, such as Saranex ™ (trademark of Dow Chemical USA), flame retardant polyethylene, a reflective layer such as metal foil; and, a final layer of clear, heat sealable flame retardant polyethylene. The clear outer polyethylene layer allows the heat from flashes to pass through to the reflective layer where the heat energy is reflected. The reflective layer also provides a first barrier against chemical permeation into the material. The Saranex layer provides a second barrier of chemical resistance, while the substrate layer provides strength to the material so that the laminate can be formed into protective clothing. The two internal polyethylene layers act as bonding agents to bond the reflective, chemical and substrate layers together. The two outer polyethylene layers are used so that the layers can be heat sealed to form the protective garment.

The present invention differs from the materials described in Athey and Nuwayser patents in that the present invention offers a protective material that guards against chemical permeation and heat flashes. Athey and Nuwayser's disclosed material provide protective material only for chemical resistance. The chemical resistant barrier of the prior art material is a foil or metal alloy layer. Unsupported foil or metal alloys are inherently disadvantageous for chemical barriers in that they are susceptible to scratching and the formation of pinholes when flexed or creased or exposed to corrosive chemicals. Accordingly, unsupported foil is not sufficiently impermeable to chemicals under current standards of protections. Thus, the foil layer is not, by itself, durable enough for use as a chemical barrier in protective clothing. Applicant's invention uses the foil or metal barrier to guard against heat flashes while adding additional chemical resistive barriers to prevent chemical permeation.

BRIEF DESCRIPTION OF THE DRAWINGS

The drawing is a cross-sectional view of the seven layers of the laminate material.

DETAILED DESCRIPTION OF THE PREFERRED EMBODIMENT

Referring to the drawing, there is shown a cross-sectional view of the seven-layer laminate material 101. The layer 107 closest to the skin is a thermoplastic film such as polyethylene that is flame retardant, heat sealable and of a preferred thickness of roughly 0.001 in. This layer's function is to enable the laminate layers to be heat sealed between layer 107 and another layer 102. If, it is not desirable for the laminate to be heat sealed, the layer 107 is not necessary.

The second layer 106 away from the skin, is a cloth substrate material of a preferred thickness of roughly 0.002 to 0.01 in. The substrate layer 106 provides strength for the laminate material to inhibit tearing or stretching. The substrate layer 106 may be comprised of, for example, Tyvek TM (trademark of DuPont), a spun bonded olefin; Cerex, a spun bonded one hundred percent nylon 6.6; Nomex, a long chain polyamide; or, spun laced Nomex, a long chain polyamide that is spun rather than woven. The substrate material must be sufficiently pliable to enable the laminate to be manufactured into protective garments.

The third layer 104, away from the skin, is a flame retardant thermoplastic film such as polyethylene of a preferred thickness of roughly 0.001 in. This layer 104 acts as an adhesive to bond the substrate layer 106 to a fourth layer 105. The fourth layer 105 acts as the primary chemical barrier to prevent chemicals from passing through the material and onto the fire fighter's skin. The fourth layer 105 is of a preferred thickness of roughly 0.0015 to 0.00275 in. and can be any chemically resistant material that is impenetrable to a braod spectrum of toxic materials. Examples of such materials are, Saran, a polyvinylidene chloride; Sareanex, a laminate comprised of Saran sandwiched between a layer of polyethylene and a layer of ethylene vinyl acetate; skived Teflon, a tetrafluroethylene that has been sliced into thin layers; ethylene vinyl acetate; Viton, a vinylidene flouride hexafluoropropylene copolymer; and butyl rubber. The use of material compositions for the fourth layer 105 is dependent on the type of chemical or toxic agent that the garment will be used to guard against. For example, if the suit is used to protect against exposure to gasoline, the layer may be a Viton and if the fire fighter may contact acetone, the layer may be made of butyl rubber. This layer 105 must be highly impenetrable to the chemical, yet posses qualities such as flexibility so that the material can be made into protective clothing.

The fifth layer 108, away from the skin, is the same as layer 104, a flame retardant thermoplastic film such as polyethylene used to adhesively bond the chemical resistant layer 105 to a reflective layer 103. This layer 108 is of a preferred thickness of roughly 0.001 in.

The reflective layer is the sixth layer away from the skin. the reflective layer 103 provides protection against heat produced by sudden heat flashes. The reflective layer 103 is a preferred thickness of roughly 0.0035 to 0.005 in. and can be any type of metal foil or metalized film material having a high degree of reflectivity such as aluminum foil or metalized polyethylene. The desired reflectivity can also be achieved by using a layer comprised of aluminum particles vapor deposited onto a cloth.

The seventh and final layer 102 is clear, flame retardant polyethylene of a preferred thickness of roughly 0.001 in. The seventh layer 102 adhesively bonds to the reflective layer 103 and acts both to protect the reflective layer 103 and to permit the laminate to be heat sealed between layers 102 and 107. The seventh layer 102 must be clear to allow the reflective properties of layer 103 to reflect radiant heat away from the laminate material. If the seventh layer 102 were not clear, the reflective properties of the metallic layer 103 would be inhibited and heat would not be reflected from the material. The heat, accordingly, would be absorbed into the seventh layer 102 and the material would char or burn causing serious injury or death to the fire fighter.

It can be seen from the above description that the present invention provides a laminate material having properties to protect against both chemical contact and heat flashes at the same time. The material is lightweight, yet durable enough to be manufactured into protective clothing such as total encapsulating suits, gloves, boots, etc.

The material has been described in its preferred embodiment. There are numerous modifications and variations of the present invention that are made possible by the above teachings. It is therefore to be understood that within the scope of the appended claims, the invention may be practiced otherwise than as specifically described herein.

We claim:

1. A laminate material suitable for use as protective clothing comprising:
   a. a first layer of flame retardant heat sealable thermoplastic film;
   b. a second layer bonded to said first layer comprising a pliable cloth substrate;
   c. a third layer that is impermeable to toxic agents and bonded through a flame retardant thermoplastic film layer to said second layer;
   d. a fourth layer comprising a material reflective to radiant heat and bonded through a flame retardant thermoplastic film layer to said third layer; and
   e. a fifth layer of flame retardant, substantially radiant heat transparent and light transparent, heat sealable, thermoplastic film bonded to said fourth layer.

2. A laminate material according to claim 1 where said second layer may be a spun bonded olefin; a spun bonded one hundred percent nylon 6.6 or, a long chain polyamide.

3. A laminate material according to claim 1 where said third layer may be a polyvinylidene chloride; a laminate comprising polyethylene and polyvinylidene chloride and ethylene vinyl acetate; a skived tetrafluoroethylene; an ethylene vinyl acetate; a vinylidene flouride hexafluoropropylene copolymer; or, a butyl rubber.

4. A laminate material according to claim 1 where said fourth layer is a metal foil; a metal film; or, a metalized thermoplastic film.

5. A laminate material according to claim 1 where said fourth layer is a metal vapor deposited onto a cloth.

6. Clothing garments for use as protection against chemical exposure and heat flashes made from a laminate material comprising:
   a. a first layer of flame retardant heat sealable thermoplastic film;
   b. a second layer bonded to said first layer comprising a pliable cloth substrate;
   c. a third layer that is impermeable to toxic agents and bonded through a flame retardant thermoplastic film layer to said second layer;
   d. a fourth layer comprising a material reflective to radiant heat and bonded through a flame retardant thermoplastic film layer to said third layer; and
   e. a fifth layer of flame retardant, substantially radiant heat transparent and light transparent, heat sealable, thermoplastic film bonded to said fourth layer.

7. Clothing garments according to claim 6 where said second layer may be a spun bonded olefin; a spun bonded one hundred percent nylon 6.6 or, a long chain polyamide.

8. Clothing garments according to claim 6 where said third layer may be a polyvinylidene chloride; a laminate comprising polyethylene and polyvinylidene chloride and ethylene vinyl acetate; a skived tetrafluoroethylene; an ethylene vinyl acetate; a vinylidene flouride hexafluoropropylene copolymer; or, a butyl rubber.

9. Clothing garments according to claim 6 where said fourth layer is a metal foil; a metal film; or, a metalized thermoplastic film.

10. Clothing garments according to claim 6 where said fourth layer is a metal vapor deposited onto a cloth.

* * * * *

UNITED STATES PATENT OFFICE
CERTIFICATE OF CORRECTION

PATENT NO. : 4,792,480
DATED : Dec. 20, 1988
INVENTOR(S) : Paul X. Freund, Sheridan J. Rodgers, Christopher J. Kairys It is certified that error appears in the above-identified patent and that said Letters Patent is hereby corrected as shown below:

Col. 3, line 43, after "a" delete "braod" and substitute therefor --broad--; and Col. 3, line 45, after "chloride;" delete "Sareanex" and substitute therefor --Saranex--; and Col. 3, line 67, after "skin." delete "the" and substitute therefor --The---;

Signed and Sealed this

Second Day of May, 1989

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,792,480
DATED : December 20, 1988
INVENTOR(S) : Paul X. Freund, Sheridan J. Rodgers, Christopher J. Kairys It is certified that error appears in the above-identified patent and that said Letters Patent is hereby corrected as shown below:

On the cover page of the patent, insert Assignee:

--Mine Safety Appliances Company, Pittsburgh, PA--.

Col. 3, line 45, after "a" delete "tetrafluroethylene" and substitute therefor --tetrafluoroethylene--.

Signed and Sealed this

Seventeenth Day of October, 1989

*Attest:*

DONALD J. QUIGG

*Attesting Officer*    *Commissioner of Patents and Trademarks*